(No Model.) J. L. JÖNSSON. 2 Sheets—Sheet 1.
JOURNAL BEARING.
No. 530,274. Patented Dec. 4, 1894.
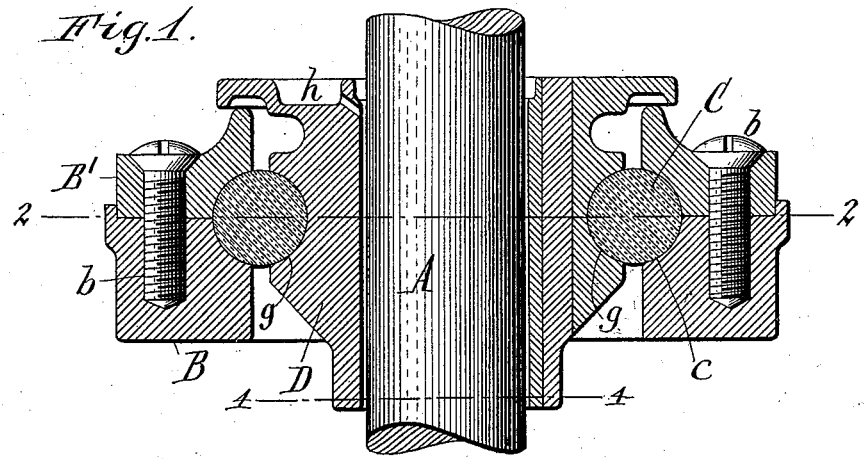
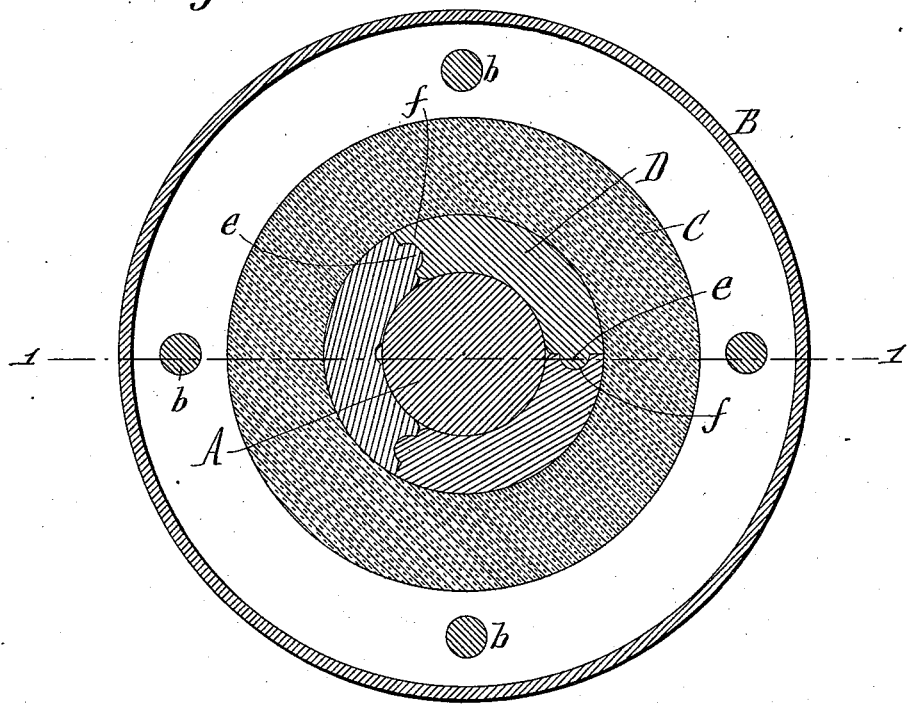
WITNESSES.
J. L. Jönsson INVENTOR
By Wilhelm Kramer
ATTORNEYS (No Model.)   J. L. JÖNSSON.   2 Sheets—Sheet 2.
JOURNAL BEARING.

No. 530,274.   Patented Dec. 4, 1894.

WITNESSES.
Chas. F. Burkhardt.
Theo. L. Popp.

J. L. Jönsson INVENTOR
By Wilhelm Bonner
ATTORNEYS.

UNITED STATES PATENT OFFICE.

JOHAN LUDVIG JÖNSSON, OF STOCKHOLM, SWEDEN, ASSIGNOR TO THE AKTIEBOLAGET SEPARATOR, OF SAME PLACE.

JOURNAL-BEARING.

SPECIFICATION forming part of Letters Patent No. 530,274, dated December 4, 1894.

Application filed November 11, 1893. Serial No. 490,668. (No model.)

*To all whom it may concern:*

Be it known that I, JOHAN LUDVIG JÖNSSON, a subject of the King of Sweden and Norway, residing at Stockholm, in the Kingdom of Sweden, have invented a new and useful Improvement in Journal-Bearings, of which the following is a specification.

This invention relates to journal boxes which are employed for supporting vertical shafts or spindles which run at a very high speed, for instance the spindles of centrifugal creamers or other centrifugal separators.

In machines of this character the speed of the spindle often exceeds five thousand revolutions per minute, and at this high speed the vibrations of the bowl, when it gets out of balance, cause great lateral pressure on the bearings, whereby excessive friction and heating are caused and which is very troublesome and destructive.

My invention has for its object to render the bearing yielding to these lateral strains and to permit the bearing to expand in case of heating, thereby preventing the spindle from binding in the bearing and avoiding the difficulties resulting therefrom.

Figure 3:
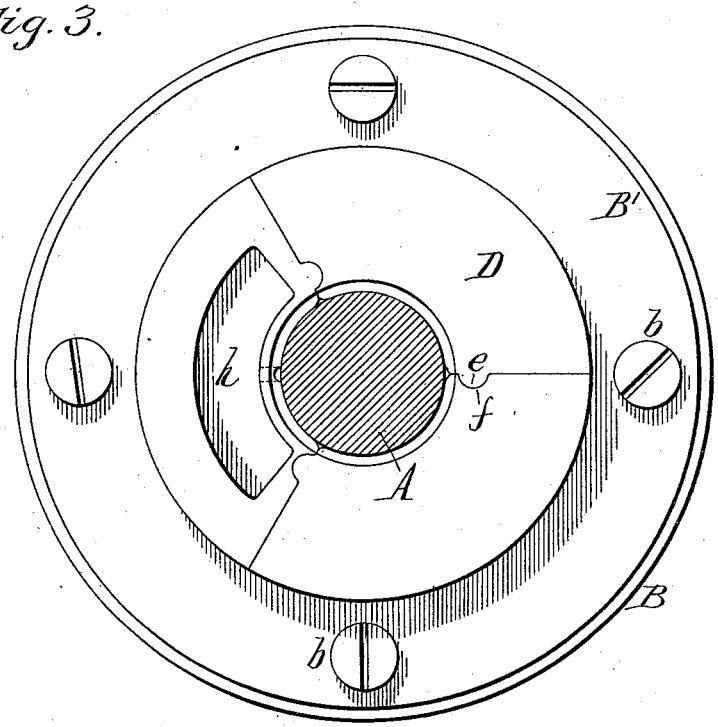
Figure 4:
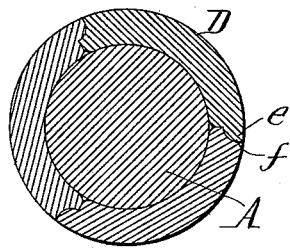

In the accompanying drawings consisting of two sheets: Figure 1 is a vertical section of my improved bearing in line 1—1, Fig. 2. Fig. 2 is a horizontal section in line 2—2, Fig. 1. Fig. 3 is a top plan view of the bearing showing the spindle in section. Fig. 4 is a horizontal section in line 4—4, Fig. 1.

Like letters of reference refer to like parts in the several figures.

A represents a vertical spindle, for instance that of a centrifugal separator.

B B' represent the two parts of the stationary annular frame of the bearing in which the spindle is supported and which may be of any ordinary or suitable construction. In centrifugal creamers the lower part B of this frame is usually secured to the stationary main frame of the machine and the upper part B' is secured upon the lower part B by screws $b$ for the purpose of permitting the ready insertion and removal of a rubber ring C which is seated in a groove $c$ formed in the inner face of this annular frame.

D represents the bearing in which the spindle runs and which is composed of three, or any other suitable number of sections arranged lengthwise of the spindle and circumferentially around the same or so that the joints between the sections are parallel with the axis of the spindle. These sections are preferably provided on their contiguous faces with inter-locking tenons, ribs or projections $e$ and grooves $f$, running lengthwise of the sections or perpendicularly, so that adjacent sections are connected by a movable joint which permits of a limited movement of the sections without entirely separating the same from each other. These tenons and grooves are preferably half round in cross section.

The sections of the bearing are provided in their outer surfaces with an annular groove $g$ which faces the groove $c$ of the frame. The rubber ring C is interposed between the stationary frame B and the sections of the bearing D and is seated in the grooves $c$ and $g$.

$h$ represents a depression formed in the top of one of the sections for receiving oil.

This construction of the bearing enables the sections thereof to yield under a lateral pressure of the spindle and to resume their normal position when the pressure ceases, and it also permits the bearing to expand when the same becomes heated, thereby overcoming many of the difficulties which now attend the use of fast running spindles.

Another useful feature of this bearing is that it indicates when the rubber ring is required to be renewed. When this ring has become swelled by oil, milk or other liquid it presses the sections of the bearing so tightly together, that the excessive resistance is at once observed by the operator upon pushing the spindle down into the bearing in replacing the spindle after it has been cleaned.

I claim as my invention—

1. In an expansible bearing, the combination with bearing segments arranged circumferentially side by side, of an annular rigid supporting frame surrounding the bearing segments and an annular spring embracing the segments and arranged within the supporting frame, whereby the bearing is enabled to expand by the separation of the segments and also to yield bodily in any direction by compression of the embracing annular spring, substantially as set forth.

2. An expansible bearing composed of bearing segments arranged circumferentially side by side, and having their contiguous sides provided with interlocking projections and depressions, a stationary frame surrounding the bearing segments, and a yielding support interposed between the segments and the frame whereby the segments are permitted to change their position with reference to each other as the bearing expands and are held in register with each other at their contiguous sides, substantially as set forth.

Witness my hand this 24th day of October, 1893.

JOHAN LUDVIG JÖNSSON.

Witnesses:
E. HAASE,
KLAS EKSTRÖM.